United States Patent
Quentin et al.

(10) Patent No.: US 10,489,668 B2
(45) Date of Patent: Nov. 26, 2019

(54) METHOD FOR THE RECOGNITION OF RAISED CHARACTERS, CORRESPONDING COMPUTER PROGRAM AND DEVICE

(71) Applicant: INGENICO GROUP, Paris (FR)

(72) Inventors: Pierre Quentin, Enghien les Bains (FR); Remi Geraud, Paris (FR)

(73) Assignee: INGENICO GROUP, Paris (FR)

( * ) Notice: Subject to any disclaimer, the term of this patent is extended or adjusted under 35 U.S.C. 154(b) by 34 days.

(21) Appl. No.: 15/695,475

(22) Filed: Sep. 5, 2017

(65) Prior Publication Data

US 2018/0068196 A1 Mar. 8, 2018

(30) Foreign Application Priority Data

Sep. 5, 2016 (FR) ..................... 16 58228

(51) Int. Cl.
- *G06K 7/10* (2006.01)
- *G06K 9/18* (2006.01)
- *G06K 9/00* (2006.01)
- *G06Q 30/06* (2012.01)
- *G06K 9/46* (2006.01)

(Continued)

(52) U.S. Cl.
CPC ........... *G06K 9/18* (2013.01); *G06K 7/10861* (2013.01); *G06K 9/00201* (2013.01); *G06K 9/00214* (2013.01); *G06K 9/4661* (2013.01); *G06Q 30/0601* (2013.01); *G06F 17/5086* (2013.01);

(Continued)

(58) Field of Classification Search
CPC ............ G06F 17/5086; G06K 2209/01; G06K 7/10861; G06K 9/00201; G06K 9/00214; G06K 9/18; G06K 9/4661; G06Q 30/0601; G06Q 40/04
See application file for complete search history.

(56) References Cited

U.S. PATENT DOCUMENTS 3,627,991 A * 12/1971 Beall .................. G06K 7/10831
235/454
4,845,770 A 7/1989 Koshida
(Continued)

FOREIGN PATENT DOCUMENTS

| FR | 2607288 A1 | 5/1998 |
|---|---|---|
| JP | 2004178529 A | 6/2004 |
| JP | 2006221431 A | 8/2006 |

OTHER PUBLICATIONS

French Search Report and Written Opinion dated May 29, 2017 for corresponding French Application No. 1658228, filed Sep. 5, 2016.
(Continued)

*Primary Examiner* — Bhavesh M Mehta
*Assistant Examiner* — Ian L Lemieux
(74) *Attorney, Agent, or Firm* — David D. Brush; Westman, Champlin & Koehler, P.A.

(57) ABSTRACT

A method of character recognition is implemented by an electronic device to recognize, in an image representing an object comprising at least one raised character, called a basic image, at least one raised character of the basic image. The method includes: a phase of processing at least one image, the phase including at least one implementation of a Phong reflection module and delivering at least one identification image; and a phase of identifying characters as a function of the basic image and the at least one identification image.

11 Claims, 3 Drawing Sheets

(51) Int. Cl.
   *G06F 17/50*      (2006.01)
   *G06Q 40/04*      (2012.01)
(52) U.S. Cl.
   CPC ......... *G06K 2209/01* (2013.01); *G06Q 40/04* (2013.01)

(56) References Cited

U.S. PATENT DOCUMENTS

| | | | |
|---|---|---|---|
| 6,628,808 B1* | 9/2003 | Bach | G06K 9/036 235/380 |
| 6,631,364 B1* | 10/2003 | Rioux | G06F 17/3025 |
| 7,492,490 B2* | 2/2009 | Silverbrook | B41J 2/14 348/296 |
| 2008/0112596 A1* | 5/2008 | Rhoads | G06K 9/00577 382/115 |
| 2012/0294534 A1 | 11/2012 | Watanabe et al. | |
| 2014/0032406 A1* | 1/2014 | Roach | G06Q 20/042 705/42 |
| 2015/0350562 A1* | 12/2015 | Hubel | H04N 5/265 348/239 |
| 2016/0019431 A1* | 1/2016 | Wang | G06K 9/2054 382/182 |

OTHER PUBLICATIONS

Jianmei Li et al., Contrast enhancement for images of raised characters on region of interest, Intelligent Control and Automation (WCICA), 2010 8th World Congress on, IEEE, Piscataway, NJ, USA, Jul. 7, 2010 (Jul. 7, 2010), pp. 6258-6261, XP031736890.

Mancas-Thillou et al., "Color text extraction with selective metric-based clustering", Computer Vision and Image Understanding, Academic Press, US, vol. 107, No. 1-2, Jun. 1, 2007 (Jun. 1, 2007), pp. 97-107, XP022103083.

\* cited by examiner ing specific lighting conditions when capturing the image of
METHOD FOR THE RECOGNITION OF RAISED CHARACTERS, CORRESPONDING COMPUTER PROGRAM AND DEVICE This Application claims priority to and the benefit of French Patent Application No. 1658228, filed Sep. 5, 2016, the content of which is incorporated herein by reference in its entirety.

1. FIELD OF THE INVENTION

The present invention relates to optical character recognition. More specifically, the present invention relates to the optical recognition of embossed or raised characters. The present technique can be applied especially to the reading of embossed or raised characters on physical carriers such as for example bank cards.

2. PRIOR ART

E-commerce is becoming increasingly unavoidable in daily life. There are several modes of payment in online purchases. These are for example bank cards, intermediary services such as Paypal, or bank transfers. Among known payment modes, bank card payment is the most widespread and is offered by almost all online commercial sites.

When a user purchases goods or items with his bank card on an Internet site, he has to provide information about his bank card. This information can include for example a card number (PAN or Primary Account Number) comprising 16 digits, an expiry date, a name of the bank holder and a verification code (MasterCard CVC or Visa Card CVV). The user must read all this information and enter it by hand onto a web page in order to make his online payment. The visual reading and manual entry of information is complicated and can be affected by human error which would lead to losses of sales volumes.

It has been proposed to apply a classic OCR technique to read the relevant information on the card and enter it automatically on the web page instead of having the user do it. The OCR technique is adapted to recognizing standard texts printed in black ink on flat paper. However, this method fails spectacularly in the reading of information on a bank card. The fact is that the items of information on a bank card are embossed or raised (according to the ISO/IEC 7812 standard) with foil stamping in order to facilitate reading by users. The appearance of the raised letters and digits is therefore very different from that of the letters and digits printed in black ink on flat, white paper. The classic OCR technique, which is adapted to recognizing characters printed on flat, white paper is therefore not capable of recognizing raised characters. Besides, the background of a bank card is often richly colored and decorated. In addition, the ink placed on the characters of the bank card tends to disappear with time and use. It is then very difficult to distinguish one character or another on the card. This raises additional problems for the classic OCR technique.

The "card.io" application proposes a solution that implements a classic OCR technique to recognize raised characters on a bank card using an image captured by a camera. However, because of the problem related to raised characters, this solution calls for specific lighting conditions such as for example lighting through the flash mechanism of a camera or mobile phone. This very soon reduces the charge in the battery of the camera or the mobile telephone. In addition, the application sometimes does not even have reliable results and/or an acceptable response time.

A solution therefore needs to be found, enabling speedy and reliable recognition of raised characters without dictating specific lighting conditions when capturing the image of the raised characters.

3. SUMMARY OF THE INVENTION

The proposed technique does not present the problems of the prior art. More particularly the proposed technique relates to a method of character recognition, a method implemented by means of an electronic device of a type of consisting of the recognition, in an image representing an object comprising at least raised character, called a basic image, of at least one raised character of said basic image.

Such a method comprises:
- a phase for processing at least one image, said phase comprising at least one implementation of a Phong reflection model and delivering at least one identification image;
- a phase for identifying characters as a function of the basic image and said at least one identification image.

According to one particular characteristic, said phase for processing said at least one image comprises a step for building a normal map representing normals of the dots on at least one zone of the basic image delivering said identification image.

Unlike a basic image, the normal map no longer comprises information on luminance and colors. The identification of the characters is thus simpler and more reliable.

According to one particular characteristic, said phase for processing said at least one image comprises a step for the generation by the Phong model, preliminarily or on request, of model images of raised characters according to plurality of pre-determined lighting conditions delivering a plurality of sets of reference images;

and said phase for identifying comprises:
- a step for comparing at least certain portions of the basic image with at least certain of the reference images, delivering a list of selected reference images, called a list of identification images, that correspond to the characters in the basic image; and
- a step for recognizing characters in the basic image of the bank card using the list of identification images.

According to one particular characteristic, the raised characters are on a bank card in said basic image.

Thus, the characters on the bank card can be recognized by the method without requiring visual reading and manual entry by a user.

According to one particular characteristic, the method comprises a phase of preliminary processing of an image of the bank card captured by camera, delivering said basic image.

According to one particular characteristic, said phase of preliminary processing comprises the steps of:
- detecting edges of the bank card, delivering an intermediate image;
- selecting lines in the intermediate image;
- computing the intersections of the lines, delivering four corners of the bank card; and
- converting the intermediate image so that the four corners coincide with four corners of a rectangle, delivering said basic image.

Thus, the preliminary processing phase improves the quality of the captured image. The characters on the bank card in the basic image are more easily recognized.

According to one particular characteristic, the step for building comprises:

a step for identifying a flat zone of said bank card on said basic image;

a step for determining a lighting condition from a light intensity of a pixel or a group of pixels on the flat zone of the bank card;

a step for computing normals of said dots of said at least one zone according to the determined lighting condition.

Thus, the lighting condition is determined by means of a flat surface of the bank card. The normal map can be determined simply and reliably.

According to one particular characteristic, the step for determining and the step for computing use the following equation according to the Phong illumination model:

$$I_P = k_a i_a + \sum_m \left( k_d (\hat{L}_m \cdot \hat{N}) i_{m,d} + k_s (\hat{R}_m \cdot \hat{V})^\alpha i_{m,s} \right)$$

where:

$k_a \in [0, 1]$ is a constant related to the ambient component;
$k_d \in [0, 1]$ is a constant related to the scattered component;
$k_s \in [0, 1]$ is a constant related to specular component;
$\alpha \gg 1$ is a constant related to the brilliance of the material;
m is the number of light sources;
$I_P$ represents a total reflected intensity at a given point;
$\hat{L}$ is a director vector of light;
$\hat{N}$ is a director vector of the surface normal;
$\hat{R}$ is a director vector of the direction in which light would be reflected on a mirror, $\hat{R} = 2(\hat{L} \cdot \hat{N})\hat{N} - \hat{L}$.

According to one particular characteristic, said step of computation comprises the following steps:

identifying a minimum value of the pixels of said at least one zone of said basic image;

deducting said minimal value from the values of the pixels of said at least one zone.

Thus, the ambient component is eliminated. The computation of the normals of the dots of the target zone is simplified.

According to one particular characteristic, said phase for identifying said characters comprises:

a step for sub-dividing said normal map, delivering a list of sections of said normal map, each section corresponding to a character in said at least one zone;

a step for building a list of current vectors from said list of sections, each current vector representing a section;

a step for comparing said current vectors with a list of model vectors preliminarily built on the basis of normal mappings of the known characters, each model vector corresponding to a known character;

a step for determining a list of current characters corresponding to said list of current vectors.

The comparison of the vectors is simpler to carry out. It is enough to compute a distance between two vectors. The phase for identifying the characters is thus simplified.

According to one particular characteristic, said known characters comprise capital letters A to Z of the Roman alphabet and the ten Arabic numerals 0 to 9.

Thus, the list of model vectors corresponds only to the frequent characters. It is not necessary to build a large list of model vectors. The step for comparing is thus simplified because the number of model vectors is reduced.

According to one particular characteristic, said current vector and said model vectors have m×n dimensions, each of said normal maps of the known characters having a size of m×n pixels.

According to one particular characteristic, said at least one zone comprises a zone of a card number of said bank card and said list of current characters comprises said card number of said bank card.

According to one particular characteristic, said method furthermore comprises a step for verifying said card number of said bank card according to Luhn's formula.

It is thus possible to verify the validity of the digits of the card number of a determined bank card by the method.

According to another aspect, the invention also relates to an electronic character recognition device, and an electronic device of the type comprising means for the recognition, in an image representing an object comprising at least one raised character, called a basic image, of at least one raised character of said basic image.

Such a device comprises:

means for processing at least one image, said means comprising means for implementing a Phong reflection model and delivering at least one identification image;

means for identifying characters as a function of the basic image and of said at least one identification image.

According to one specific implementation, the different steps of the methods according to the invention are implemented by one or more software programs or computer programs comprising software instructions to be executed by a processor of a computer device, such as a terminal according to the invention and being designed to command the execution of the different steps of the method.

The invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Furthermore, the information medium can be a transmissible medium such as an electrical or optical signal that can be conveyed via an electrical or optical cable, by radio or by other means. The program according to the invention can especially be uploaded to an Internet type network.

As an alternative, the information carrier can be an integrated circuit into which the program is incorporated, the circuit being adapted to executing or to being used in the execution of the method in question.

According to one embodiment, the invention is implemented by means of software and/or hardware components. In this regard, the term "module" can correspond in this document equally well to a software component as to a hardware component or to a set of hardware and software component.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc.).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, smart card, a memory card, an electronic board for the execution of firmware etc.

Each component of the system described here above can of course implement its own software modules.

The different embodiments mentioned here above as well as the characteristics that compose them can be combined with one another to implement the invention. For example, the present technique can equally well be implemented on any type of carrier that comprises raised or embossed characters and is in no way limited to bank cards.

4. FIGURES

Other features and advantages of the invention shall appear more clearly from the following description of two embodiments given by way of simple illustratory and non-exhaustive examples and from the appended drawings, of which:

5. DETAILED DESCRIPTION

5.1. General Principle

Figure 1:
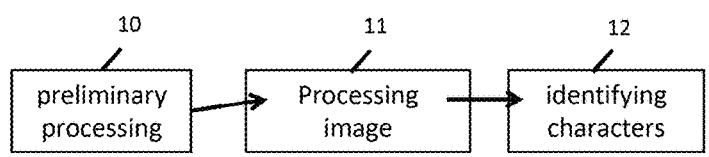
FIG. 1 illustrates the phases of the method for recognizing raised characters according to the proposed technique.

As explained here above, character recognition software programs have great difficulty in recognizing raised characters whether it is on bank cards or on other carriers (signposts, signs etc.). In general, the computerized processing of an image for the recognition therein of a shape or of characters raises problems once the lighting conditions are poor. The present technique on the contrary ingeniously makes use of lighting conditions to facilitate the recognition of raised characters (alphabetical characters, numerical characters or again characters in Braille). Here below, we shall strive essentially to describe a process of recognition relative on bank cards but it is clear that the present invention can be applied to many other fields especially the recognition of characters in Braille.

The general principle relies on a method of construction based especially on the Phong reflection model. This method is implemented to enable the recognition of raised characters. More particularly, in a first embodiment, the building method is applied to a basic image comprising characters to be recognized and it enables the building of a derived image (called a normal map) comprising the characters to be recognized in a more easily recognizable form (i.e. the image is no longer in relief). In a second embodiment, a building method is applied to a series of characters as a function of determined lighting conditions in order to produce reference images of the raised characters (synthesis images), the reference images being then used to identify characters to be recognized in a basic image.

The use of one or another of these embodiments (or of certain characteristics of these embodiments) to carry out recognition is made possible by several factors. One of the factors lies in a priori knowledge of the thickness of the raised (or embossed) characters to be recognized. Whether it is for the characters of bank cards or again for characters or words in Braille, the standards lay down a thickness for these characters. For bank cards, this standardized thickness of the embossing makes sure that the card can be inserted into card readers for example: each raised character therefore has a constant and known maximum thickness. Besides, another known factor is the flatness of the surface situated outside the characters (for example the surface of a bank card is flat, as is the surface of a text in Braille). As described here below, these two factors enable the determining of a normal map (or altitude map) which is then used to recognize characters more easily.

Thus, in a first embodiment, a normal map is built. This normal map represents normals of the dots in a target zone comprising raised characters in a basic image. A dot in an image corresponds to one pixel of the image. Each pixel of the normal map is actually a vector giving the information on the elevation and inclination of its surface, i.e. the surface of the texel on to which the normal map will be applied. The characters in the target zone can be identified from the normal map (or altitude map). Indeed, the normal map makes it possible to characterize the shapes of the raised characters on a target zone. The characters can be identified more easily and more speedily from the shapes of the raised characters because a normal map (unlike a basic image) no longer comprises information on luminance and colors. The characters identified by the method according to the proposed technique are thus more reliable. In the prior art solution, the characters are identified from an image (a photograph) on which raised characters are captured (on a bank card for example). The information on the luminance and the colors of the image complicate and slow down the identification process and make the result unreliable.

The basic image can be a photograph of an object (a physical carrier) comprising raised characters. The photograph can be captured by any device (for example a camera, a smartphone, a tablet such as an iPad etc.) comprising a camera. According to another embodiment, this basic image can result from a preliminary phase for processing a captured photograph. This preliminary processing comprises any type of operation to edit the photograph (trimming, rotation, adjusting settings, distortion etc.) and delivers a basic image. The building phase can thus be carried from an image that is more reliable and adapted to optical recognition.

In general, as illustrated with reference to FIG. 1, whatever the embodiment chosen to carry out character recognition, the invention proposes a method for the recognition of raised characters in a basic image comprising:
- a phase of preliminary processing 10 of an image (P1) of an object comprising raised characters: this phase of preliminary processing converts the image (P1) into a standard and exploitable format called a basic image (P2); this processing improves the precision and reliability of the overall method; this preliminary processing phase can be optional, especially when the quality of the captured image is satisfactory;
- a phase 11 for processing at least one image comprising an implementation of a Phong reflection model;
- a phase 12 for identifying characters as a function of the basic image and the previously performed processing phase.

When the Phong model is used for processing the basic image, as referred to in the first embodiment here above, the processing phase 11 is implemented to process the basic image (P2) and it comprises:
- a step 11-1 for building a normal map representing normal directions of the dots on at least one zone of the basic image; the normal map characterizes the shape of a target zone of the image; the normal map does not include information on the luminance and colors of the basic image; for the requirements of the present invention, the normal map is also called an identification map;

and the identification phase 12 comprises:
- a step 12-1 of searching for characters in at least one zone of said identification image (the normal map); in this phase, the characters are identified according to the shape characterized by the normal map of the target zone; should the characters be on a bank card, this identification phase can take account of known specifications (for example: ISO/IEC 7810 ID-1) of the bank card (the size of the card, the locations of the raised character zones, the font of the characters etc.).

When the Phong model is processed for reference images, as mentioned in the second embodiment here above, the processing phase 11 comprises:
- the generation, by the Phong model, of the reference images of the raised characters in different lighting conditions; the selection of reference images delivering identification images; it is also noted that the reference images (synthesis images) can be generated on the fly if the device that implements the recognition has sufficient computation capacities (rather than being pre-generated in given conditions);

and the identification phase 12 comprises:
- the comparison of at least certain portions of the basic image of the bank card with at least certain of the identification images, delivering a list of selected identification images which correspond to the characters in the basic image; and the determining of the characters in the basic image of the bank card by means of the list of the identification images.

Here below, a detailed description is provided of the three phases of the method according to the proposed technique. The captured image is considered to be a photograph of a bank card comprising embossed (raised) characters (for example a PAN number, an expiry date and/or a holder's name).

5.2. First Embodiment: Building of the Normal Map

5.2.1. Preliminary Processing Phase

Figure 2:
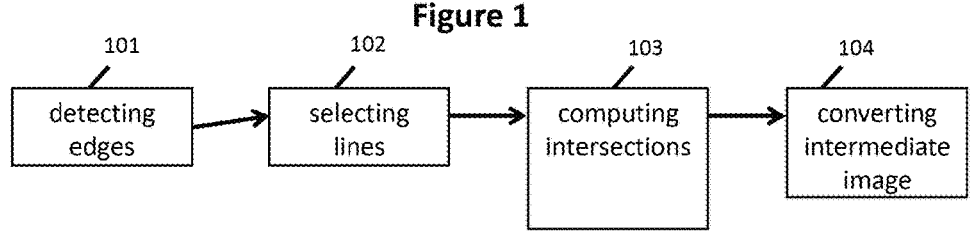
FIG. 2 illustrates the steps of a phase of preliminary processing of an image of a bank card captured by a camera.
Figure 3:
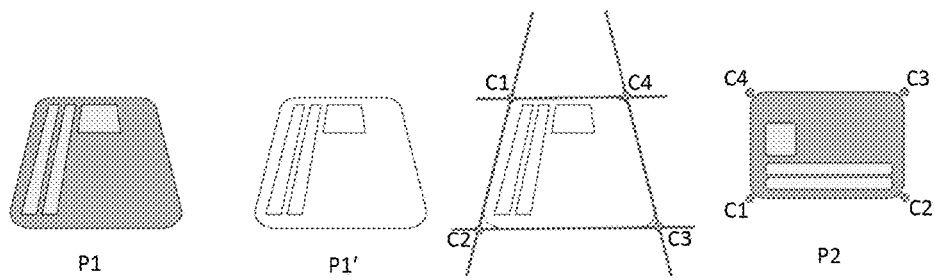
FIG. 3 illustrates the changing of the image of the bank card captured in the phase of preliminary processing.

The preliminary processing of the image of the bank card comprises the operations described here below with reference to FIGS. 2 and 3:
- a step 101 for detecting the edges of the bank card; this step can be performed in different ways, for example a Gaussian Blur operation followed by a Canny filtering operation (Canny detector) to detect contours; the parameters of the Gaussian Blur operation and the Canny filter are configured to reduce the noise of the image according to the quality of the image; this step of detection delivers an intermediate image P1';
- a step 102 for selecting lines in the intermediate image P1'; this step localizes the main lines in P1 and selects the "thickest" lines without including any already identified polygon; it can be done by using the Hough transform;
- a step 103 for computing intersections of the previous selected lines, delivering four corners (C1, C2, C3, C4) of the bank card;
- a step 104 for converting the intermediate image P1' so that the four corners (C1, C2, C3, C4) coincide with four corners of a rectangle, delivering a basic image P2; this conversion implements an inverse homographic function.

The preliminary processing described here above can be performed by using the "OpenCV" library.

It must be noted that the preliminary processing phase is not always necessary. Indeed, when the captured image is of high quality (the bank card is appreciably rectangular), it is possible to directly execute the phase for building the normal map on the basis of this captured image.

5.2.2. Phase for Building the Normal Map

5.2.2.1. Phong Illumination Model

The building phase relies on the Phong illumination model. The Phong illumination is a local model, i.e. the computation is done at each dot (pixel) of an image. This empirical model makes a credible computation of the light reflected by a dot under study. To this end, it combines three elements: ambient light, scattered light and specular light. The goal is to compute the light intensity that will be sent out by reflection by the dot studied, illuminated by another source assumed to be a pinpoint source, in a precise direction (that of the observer). To this end, the light is separated into three components:
- the ambient component represents the parasites coming from elements other than the source considered, the light reflected by other dots, for example; the ambient light is assumed to be equal at all points in space;
- the incident light is reflected in all directions; the scattered component indicates the intensity that returns, in taking account of the inclination at which the light arrives at the surface but in assuming the intensity is the same whatever the direction taken by the reflected ray;
- nevertheless, there is more light sent back in the direction of geometrical reflection (the direction in which the ray would return upon reaching a mirror); the role of this specular component is to take account of this.

For each material, characteristic constants are defined:
- $k_a \in [0, 1]$ is a constant linked to the ambient component;
- $k_d \in [0, 1]$ is a constant linked to the component scattered in all directions;
- $k_s \in [0, 1]$ is a constant related to the specular component;
- $a \gg 1$ is a constant related to the brilliance of the material: the greater the value of a, the more brilliant is the surface.

The terms $i_a$, $i_d$ and $i_s$ denote the intensity of the ambient, scattered and specular light. $I_a$, $I_d$ and $I_s$ are the values of reflected intensity of a studied dot (pixel) of an image. $I_P$ is the total of the intensities reflected from this studied dot (pixel).

The following director vectors are defined: $\hat{L}$ for light, $\hat{N}$ for the normal of the studied dot on the surface, $\hat{R}$ for the direction in which the light will be reflected on a mirror, $\hat{V}$ for the direction of view of the observer.

$\hat{R}$ is deduced by the following relationship:

$$\hat{R} = 2(\hat{N} \cdot \hat{L})\hat{N} \cdot \hat{L} \quad (1)$$

The total of the intensities reflected from a studied dot is represented by the following equation:

$$I_P = I_a + I_d + I_s \quad (2)$$

wherein:

$$I_a = i_a k_a \quad (3)$$

$$I_d = i_d k_d (\hat{L} \cdot \hat{N}) \quad (4)$$

$$I_s = i_s k_s (\hat{R} \cdot \hat{V})^a \quad (5)$$

For several light sources, the following complete formula is obtained:

$$I_P = i_a k_a + \Sigma_{m \in \{sources\}}(i_{d,m} k_d (\hat{L}_m \cdot \hat{N}) + i_{s,m} k_s (\hat{R}_m \cdot \hat{V})^a) \quad (5)$$

For the sake of simplicity, it is assumed that there is only one light source. Thus, a simplified equation of the total of the reflected intensities of a studied dot is obtained:

$$I_P = i_a k_a + i_d k_d (\hat{L} \cdot \hat{N}) + i_s k_s (\hat{R} \cdot \hat{V})^a \quad (6)$$

By using equation (5) or (6), it is possible to predict the appearance (the reflected intensities of the points in the form of an image) of the raised characters according to a given condition of light (the shape and the material of the raised characters are known beforehand).

Figure 4:
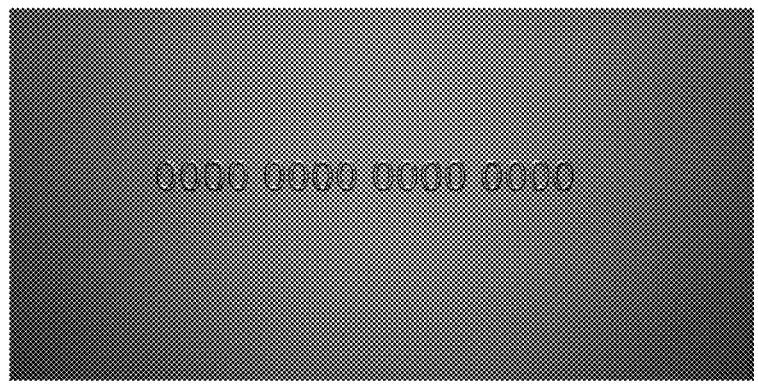
FIG. 4 illustrates the appearance of raised characters of a bank card computed according to known light conditions.

FIG. 4 is an image of the appearance of the characters "0" on a bank card according to a given condition of light. This image is computed by using the equation (5). Indeed, the shape of the bank card and the shape of the characters on the bank card comply with known standards (cf. ISO/IEC 7812). The normal $\hat{N}$ of each dot of the bank card is thus known. The characteristic constants $k_a$, $k_d$, $k_s$ and a of the material of the bank card are also known. The parameters $i_a$, $i_d$, $i_s$ and $\hat{L}$, $\hat{V}$, $\hat{R}$ are given according to the lighting conditions. Thus, the total of the reflected intensities $I_P$ of each point on the bank card can be computed. We thus obtain the image of FIG. 5 which combines all the dots of the bank card.

This image can be computed in a various ways: this image can be computed for example by using existing libraries such as "OpenGL".

5.2.2.2. Phase for Building a Normal Map

Figure 5:
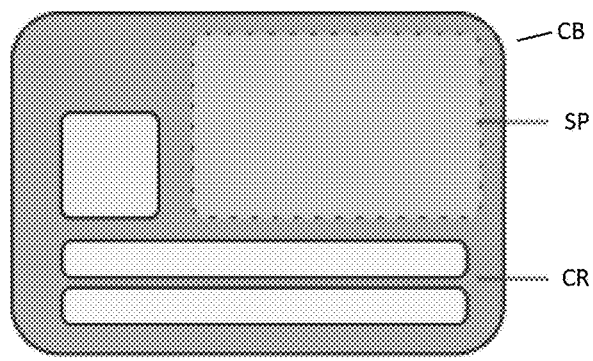
FIG. 5 illustrates a flat surface and a zone of raised text on a standard bank card.
Figure 6:
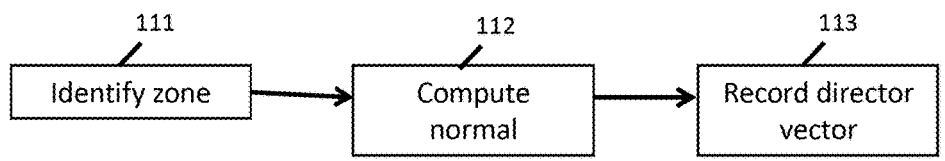
FIG. 6 illustrates the steps of the phase for building a normal map.

Here below, referring to FIGS. 5 and 6, a detailed description is provided of the phase for building a normal map.

The general principle of this phase for building consists in computing the normal $\hat{N}$ of a studied dot by using the equation (5) or (6). Indeed, once an image of raised characters on a bank card is captured, the value $I_P$ of each dot (pixel) of the image is known. The characteristic constants $k_a$, $k_d$, $k_s$ and a of the material of the bank card is also known (because the material of the card is known). The lighting conditions can be deduced by using the value $I_P$ of a dot on a flat surface of the image of the bank card. FIG. 6 illustrates a zone having a plane surface SP and a zone of raised character CR on an image of a bank card CB. The locations of the zone having a flat surface and the zone of raised characters are known because the standards of the bank cards are generally complied with. Thus, it is possible to identify 111 the zone having a flat surface SP on an image of a bank card CB.

All the dots on the flat surface SP have a known normal R that is perpendicular to the surface SP. The lighting conditions (including especially the director vector $\hat{L}$) can also be determined 111 by implementing the Phong illumination model (equation (5) or (6) on a dot on the flat surface SP (the normal $\hat{N}$ of the point is known).

When a dot is analyzed in the zone of the raised characters CR, the ambient component $i_a k_a$ can be eliminated by subtracting the minimum value of light intensity of the dots on the bank card. If we take the equation (6) at the outset, we thus obtain:

$$I_P - i_a k_a = i_d k_d (\hat{L} \cdot \hat{N}) + i_s k_s (\hat{R} \cdot \hat{V})^a \quad (7)$$

The part on the right-hand side of the equation comprises the scattered component ($i_d k_d (\hat{L} \cdot \hat{N})$) and the specular component ($i_s k_s (\hat{R} \cdot \hat{V})^a$). These two components depend solely on the normal $\hat{N}$ (the other parameters are known). The normal $\hat{N}$, which corresponds best to the light intensity of each dot in the zone of the raised characters of the bank card can be computed 112 by using standard minimizing techniques. The director vector of the normal $\hat{N}$ of each dot in the zone of the raised characters can be recorded in a normal map P3 (or altitude map).

According to another embodiment, the normal map (or altitude map) can cover the entire surface of the bank card (not only the zone of the raised characters). This normal map (or altitude map) characterizes the shape of the surface of the bank card comprising the raised characters. The characters can thus be identified from this normal map P3 (or altitude map) in the identification phase described in the section below.

5.2.3. Character Identifying Phase

As explained here above, the normal map (or altitude map) characterizes the shape of the raised characters on the bank card. It is thus possible to recognize the use of the known OCR algorithms for identifying characters from a normal map (or altitude map).

According to one embodiment of the proposed technique, the character identifying phase is carried out by using an algorithm that requires fewer computation resources. According to this algorithm, the phase for identifying characters comprises the following steps (illustrated with reference to FIG. 7):

selecting 121 a zone of raised characters of the bank card in the normal map (or attitude map), when the normal map covers the entire surface of the bank card; this step can take account of the standard known geometry of the bank card; if the normal map is generated for a zone of raised characters, this selection step could be omitted;

subdividing 122 said normal map, delivering a list of sections of said normal map, each section corresponding to a character in the zone of characters; indeed, the location of the characters on the bank card is known according to the standards of the bank card: it is thus possible to subdivide the normal map according to the specifications of the standard of the bank card; in addition, between two adjacent raised characters, there is normally a flat surface of a pre-determined width: this surface of a pre-determined width can also be used to subdivide the character into reliefs: each section can have a size of n pixels wide by m pixels high; according to one particular embodiment, each section is square shaped having a size of n pixels in width by n pixels in height;

building 123 a list of current vectors from said list of sections, each current vector corresponding to one section; each vector is thus n×m dimensions or $n^2$ dimensions when the sections are square shaped;

comparing 124 said current vectors with a list of model vectors preliminarily built from the normal maps of known raised characters, each model vector corresponding to a known raised character; the current vectors and model vectors have the same dimensions n×m or n×n. The model vectors corresponds to the normal map of the raised characters on a standard bank card; the characters generally comprise the capital letters A-Z, the digits 0-9 as well as a list that is essential to understanding the model vectors of the characters described here above; this essential list of model vectors can be presented as {V0, V1, ..., V9, VA, ..., VZ}; the list can also include model vectors of punctuation signs (<<.>>, <<,>>, etc.) and/or the lower-case letters a-z; each current vector can be compared with all the vectors in the list of model vectors in order to determine a model vector that is closest to the current vector (i.e. that has a minimum distance from the current vector); it must be noted that the list of vectors modified can be built preliminarily and stored in a memory and that the comparison can be made on the different models in parallel and independently for each model;

determining 125 a list of current characters corresponding to said list of current vectors; the character represented by the model vector closest to a current vector can be considered to be the character represented by the current vector: we thus obtain a list of characters represented by the current vectors.

The characters identified can thereafter be used for the automatic filling of the entry zones of a form displayed on a screen; this method of action enables the user to verify that the phase of recognition has taken place properly. The recognized characters can be used in the various applications such as for example online payment. In this case, other operations can be conducted subsequently to the recognition of characters in order to make sure that the recognized data is accurate.

Thus, for example, the raised characters displayed on a bank card normally comprise a number of the card (e.g. PAN (Primary Account Number)) the apparent validity of which can be verified by Luhn's formula which is also known as the "modulo 10" algorithm. This is a checksum formula used to validate bank card numbers. Thus, the phase for identifying the characters of the bank card number can include a step for verifying the number of the bank card by means of this "modulo 10" algorithm. If the detected number is not valid, a new step of comparison can be executed. In this new step of comparison, a model vector is identified for each new current vector. This model vector is for example the second closest to the current vector (the model vector that is at the second smallest distance from the current vector). Among the model vectors identified, the one at the smallest distance from its corresponding current vector is selected. The digit represented by the selected model vector replaces the corresponding digit in the non-valid number of the bank card.

According to another embodiment of the proposed technique, in the step for comparing, each current vector is compared with all the vectors in the list of model vectors. The first two or three model vectors which are the closest to the current vector (having the smallest distances from the current vector) can be selected. Thus we obtain two or three model vectors for each current vector. In other words, each current vector can probably represent one of the two or three digits represented by the two or three model vectors. In the determining step, the digits of a bank card number are determined according to two criteria:

the number is valid according to Luhn's formula; and
the model vectors representing the digits of the number have a minimum total distance.

The reliability of the method is thus improved.

5.3. Second Embodiment: Generation of (Synthesis) Reference Images and Recognition of Raised Characters The preceding sections describe the building of a normal map and the identification of the raised characters from the normal map.

Figure 7:
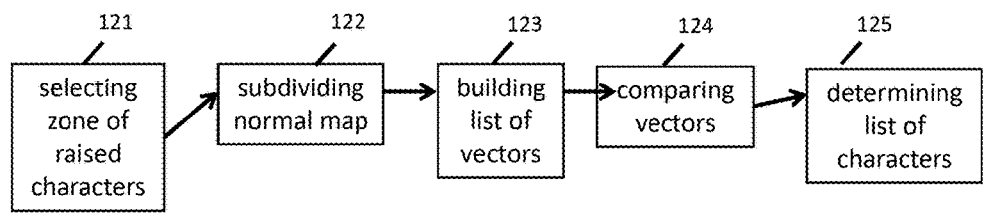
FIG. 7 illustrates the steps of the phase for identifying characters.
Figure 8:
FIG. 8 illustrates six images of the digit "0" raised and rendered in six different conditions of light.

In another embodiment of the proposed technique, it is not necessary to rebuild the normal map. The raised characters in the basic image can be identified according to a specific method for recognizing raised characters. This embodiment uses models of characters that have been pre-illuminated, according to pre-determined lighting conditions (for example about forty lighting conditions). Thus, for each character, there is a series of model images of this character, each model image corresponding to a particular condition of lighting. These model images are called reference images ($(IR_{xx})$. FIG. 7 illustrates six reference images of the raised digit "0" ($IR_0$) rendered in different lighting conditions. In fact, the reference images are rendered according to the Phong illumination model described here above because the shapes of the raised characters on a bank card are known (the normals $\hat{N}$ are known). Thus, a raised character can correspond to plurality of reference images in different lighting conditions. The images of the characters (0-9, A-Z, a-z, and special characters) rendered in a given lighting condition constitute a set of reference images ($EIR_{xx}$). For example, it is possible to generate forty sets of reference images in forty reference lighting conditions and to do so for each character (0-9, A-Z, a-z, and special characters). These sets of reference images are then saved in a memory where they can be read and downloaded or obtained in any way whatsoever in order to be compared with characters of the basic image according to the method described here above.

This method of recognition comprises the following steps:

obtaining reference images of raised characters in different lighting conditions; the characters can include the digits 0-9, the capital letters A-Z, the lower-case letters a-z and/or special characters depending on what is to be recognized; obtaining these reference images can correspond to the reading of these images in a pre-determined memory or else the downloading of these images through a communications network according to embodiments;

comparing at least certain portions of the basic image of the bank card with at least certain of the reference images of the characters according to at least one lighting condition, delivering a list of selected reference images; the selected reference images belong (ideally) to a same set of reference images according to an identical lighting condition; in addition, they are assumed to correspond best to the basic images of the characters; the reference images selected are called identification images and constitute a sub-set of sets of reference images;

a step for determining current characters in the basic images of the bank card by means of the list of the identification images.

According to one particular embodiment, the method, subsequently to the step for obtaining, can comprise a step for determining a lighting condition of the basic image of the bank card. One example of determining a lighting condition by means of a flat surface of the bank card is described in detail further above.

Once the condition of the lighting of the basic image is determined, the method comprises a step for filtering sets of reference images in order to select, among the sets of existing reference images, only a reduced number of sets corresponding to the lighting conditions of the basic image. Ideally, only one set of reference images is selected, constituting all the identification images. In this case, a character recognized on the bank card corresponds to a single identification image of the set of identification images: the list of identification images is thus constituted by a single set of reference images. The step for determining the characters is made easier because the number of identification images is greatly reduced (there is only one set of identification images).

As a complement, Luhn's formula can also be used to verify the validity of the bank card number. Indeed, the raised characters on the bank card can necessarily include the digits of a bank card number.

It can also be noted that the (synthesis) reference images can be generated on the fly if the apparatus (on which the recognition is implemented) possesses sufficient computation capacities. One promising feature of this variant is that it offers a compromise between storage capacities (there is no longer need to store N models in advance, since N is potentially very great) and computation capacities (henceforth only the images that are necessary have to be computed). The other promising feature of this variant is that it is possible to determine the lighting conditions more finely by an optimization method such as the expectation-maximization method. Concretely: the algorithm minimizes, one after the other, the lighting error (measured by comparison with the non-raised zone of the card) and the error in the reading of the characters (measured by comparing the reference image and the raised zone, possibly with penalties if the Luhn code is incorrect).

5.4. Device for Recognizing Raised Characters

Figure 9:
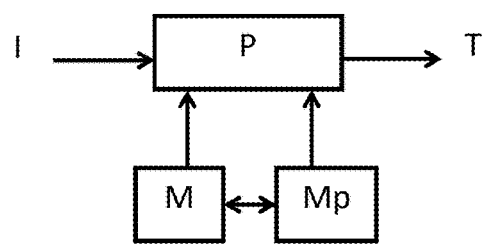
FIG. 9 illustrates a simplified structure of a device for recognizing raised characters according to the proposed technique.

Referring to FIG. 9, we present a simplified structure of a device for recognizing raised characters implementing the method according one embodiment of the proposed technique. Only the main elements pertaining to the implementation of the method are illustrated.

The device comprises a memory M comprising a buffer memory, a processing unit P equipped for example with a processor and driven by an application or a computer program Mp implementing the method of recognizing raised characters according to one embodiment of the proposed technique.

At initialization, the code instructions of the computer program Mp are for example loaded into a RAM and then executed by the processor of the processing unit P. The processing unit P inputs a signal sent out by a transmitter. The microprocessor of the processing unit P implements the methods of recognition of raised characters according to the instructions of the computer program Mp.

Preferably, the device comprises a camera used to capture an image or the object (for example a bank card) comprising raised characters. The processing unit of the device can subsequently execute the instructions of the computers to implement the character recognition method. The device (with or without camera) can include a wire communications module (USB, Ethernet, etc.) or wireless communications module (Wifi, Bluetooth®, etc.) to receive an image of a bank card coming from another electronic device (a camera, a computer, a server etc.).

The examples of embodiments described here above are obviously given only purely by way of an indication. Those skilled in the art are capable of understanding the advantages procured by the present technique and especially the advantages procured by the method for recognizing raised characters. It is clear that such a method can be used in another context without departing from the scope of the present technique.

The invention claimed is:

1. A method of character recognition implemented by an electronic device, wherein the method comprises:
   recognizing, in an image representing an object comprising at least one raised character, called a basic image, at least one raised character of said basic image, wherein recognizing comprises:
   a phase of processing at least one image, said phase comprising at least one implementation of a Phong reflection model and delivering at least one identification image, comprising generating by the Phong reflection model, preliminarily or on request, model images of raised characters in a plurality of pre-determined lighting conditions delivering a plurality of sets of reference images;
   a phase of identifying characters as a function of the basic image and said at least one identification image, comprising:
      comparing at least certain portions of the basic image with at least certain of the reference images, delivering a list of selected reference images, called a list of identification images, that correspond to the characters in the basic image; and
      recognizing characters in the basic image using the list of identification images,
   wherein said phase of processing said at least one image comprises building a normal map, representing normals of dots on at least one zone of the basic image delivering said identification image and wherein building comprises:
      identifying a flat zone on said basic image;
      determining a lighting condition from a light intensity of a pixel or a group of pixels on the flat zone;
      computing normals of said dots of said at least one zone according to the determined lighting condition.

2. The method according to claim 1, wherein the raised characters are situated on a bank card in said basic image.

3. The method according to claim 2, wherein the method comprises a phase of preliminary processing of an image of the bank card captured by a camera, delivering said basic image.

4. The method according to claim 3, wherein said phase of preliminary processing comprises:
   detecting edges of the bank card, delivering an intermediate image;
   selecting lines in the intermediate image;
   computing intersections of the lines, delivering four corners of the bank card; and
   converting the intermediate image, so that the four corners coincide with four corners of a rectangle, delivering said basic image.

5. The method according to claim 1, wherein the determining and the computing use the following equation according to the Phong illumination model:

$$I_P = k_a i_a + \sum_m \left( k_d(\hat{L}_m \cdot \hat{N}) i_{m,d} + k_s(\hat{R}_m \cdot \hat{V})^\alpha i_{m,s} \right)$$

where:
- $k_a \in [0, 1]$ is a constant related to the ambient component;
- $k_d \in [0, 1]$ is a constant related to the scattered component;
- $k_s \in [0,1]$ is a constant related to specular component;
- $\alpha \gg 1$ is a constant related to the brilliance of the material;
- m is the number of light sources;
- $I_p$ represents a total reflected intensity at a given point;
- $\hat{L}$ is a director vector of light;
- $\hat{N}$ is a director vector of the surface normal;
- $\hat{R}$ is a director vector of the direction in which light would be reflected on a mirror, $\hat{R}=2(\hat{L}\cdot\hat{N})\hat{N}-\hat{L}$.

6. The method according to claim 1, wherein said phase of identifying said characters comprises:
   sub-dividing said normal map, delivering a list of sections of said normal map, each section corresponding to a character in said at least one zone;
   building a list of current vectors from said list of sections, each current vector representing a section;
   comparing said current vectors with a list of model vectors preliminarily built on the basis of normal mappings of the known characters, each model vector corresponding to a known character;
   determining a list of current characters corresponding to said list of current vectors.

7. The method according to claim 6, wherein said current vector and said model vectors have m×n dimensions, each of said normal maps of the known characters having a size of m×n pixels.

8. The method according to claim 6, wherein said at least one zone comprises a zone of a card number of a bank card and in that said list of current characters comprises said card number of said bank card.

9. The method according to claim 8, wherein the method comprises verifying said card number of said bank card according to Luhn's formula.

10. An electronic device for recognizing raised characters in a basic image, wherein the device comprises:
    a processing unit; and
    a non-transitory computer-readable medium comprising program code instructions stored thereon, which when executed by the processing unit configure the processing unit to perform acts comprising:
    a phase of processing at least one image, said phase comprising at least one implementation of a Phong reflection model and delivering at least one identification image, comprising generating by the Phong reflection model, preliminarily or on request, model images of raised characters in a plurality of pre-determined lighting conditions delivering a plurality of sets of reference images;
    a phase of identifying characters as a function of the basic image and said at least one identification image, comprising:
        comparing at least certain portions of the basic image with at least certain of the reference images, delivering a list of selected reference images, called a list of identification images, that correspond to the characters in the basic image; and
        recognizing characters in the basic image using the list of identification images,
    wherein said phase of processing said at least one image comprises building a normal map, representing normals of dots on at least one zone of the basic image delivering said identification image and wherein building comprises:
        identifying a flat zone on said basic image;
        determining a lighting condition from a light intensity of a pixel or a group of pixels on the flat zone;
        computing normals of said dots of said at least one zone according to the determined lighting condition.

11. A non-transitory computer-readable medium comprising a computer program product stored thereon, comprising program code instructions to implement a method of recognizing, in an image representing an object comprising at least one raised character, called a basic image, at least one raised character of said basic image, when said program is executed on a computer, wherein the method comprises:
    a phase of processing at least one image, said phase comprising at least one implementation of a Phong reflection model and delivering at least one identification image, comprising generating by the Phong reflection model, preliminarily or on request, model images of raised characters in a plurality of pre-determined lighting conditions delivering a plurality of sets of reference images;
    a phase of identifying characters as a function of the basic image and said at least one identification image, comprising:
        comparing at least certain portions of the basic image with at least certain of the reference images, delivering a list of selected reference images, called a list of identification images, that correspond to the characters in the basic image; and
        recognizing characters in the basic image using the list of identification images,
    wherein said phase of processing said at least one image comprises building a normal map, representing normals of dots on at least one zone of the basic image delivering said identification image and wherein building comprises:
        identifying a flat zone on said basic image;
        determining a lighting condition from a light intensity of a pixel or a group of pixels on the flat zone;
        computing normals of said dots of said at least one zone according to the determined lighting condition.

* * * * *